United States Patent
Beaver

(10) Patent No.: US 11,995,859 B2
(45) Date of Patent: May 28, 2024

(54) SPARSE DEPTH ESTIMATION FROM PLANT TRAITS

(71) Applicant: Mineral Earth Sciences LLC, Mountain View, CA (US)

(72) Inventor: Zachary Beaver, San Francisco, CA (US)

(73) Assignee: MINERAL EARTH SCIENCES LLC, Mountain View, CA (US)

( * ) Notice: Subject to any disclaimer, the term of this patent is extended or adjusted under 35 U.S.C. 154(b) by 401 days.

(21) Appl. No.: 17/513,498

(22) Filed: Oct. 28, 2021

(65) Prior Publication Data
US 2023/0136563 A1   May 4, 2023

(51) Int. Cl.
G06T 7/593 (2017.01)
G06F 18/22 (2023.01)

(52) U.S. Cl.
CPC ............. *G06T 7/593* (2017.01); *G06F 18/22* (2023.01); *G06T 2207/10012* (2013.01); *G06T 2207/30188* (2013.01)

(58) Field of Classification Search
CPC .......... G06T 7/593; G06T 2207/10012; G06T 2207/30188; G06T 7/62; G06F 18/22; G06V 20/60; G06V 20/58
See application file for complete search history.

(56) References Cited

U.S. PATENT DOCUMENTS

| | | | |
|---|---|---|---|
| 10,008,035 | B1 | 6/2018 | Redden |
| 10,467,526 | B1 | 11/2019 | Appalaraju |
| 11,399,531 | B1 | 8/2022 | Sibley |
| 11,532,080 | B2 | 12/2022 | Yuan |
| 11,718,401 | B2 | 8/2023 | Meltzer |
| 11,737,393 | B2 | 8/2023 | Tang |
| 2004/0264762 | A1* | 12/2004 | Mas ............. G06V 20/10 382/154 |
| 2006/0158730 | A1 | 7/2006 | Kira |
| 2011/0080463 | A1 | 4/2011 | Endo |
| 2014/0129320 | A1 | 5/2014 | Jebara |
| 2015/0015697 | A1 | 1/2015 | Redden et al. |

(Continued)

OTHER PUBLICATIONS

Anwar et al., "An Assessment of Image Matching Algorithms in Depth Estimation" International Journal of Image Processing (IJIP), vol. (7): Issue (2): 2013. 15 pages.

(Continued)

*Primary Examiner* — Christopher M Brandt
(74) *Attorney, Agent, or Firm* — Gray Ice Higdon

(57) ABSTRACT

Implementations are described herein for performing sparse depth estimation in the agricultural domain. In various implementations, one or more spatial aspects of a first visual annotation of a first candidate plant trait instance depicted in a first stereo image may be compared to one or more spatial aspects of a second visual annotation of a second candidate plant trait instance depicted in a second stereo image. Based on the comparison, it may be determined that the first and second candidate plant trait instances are a match for the same plant trait instance across the first and second stereo images. A disparity may be determined between the first and second candidate plant trait instances. Based on the disparity, a depth associated with the same plant trait instance may be estimated and used for various purposes.

20 Claims, 8 Drawing Sheets

(56) References Cited

U.S. PATENT DOCUMENTS

| | | | |
|---|---|---|---|
| 2016/0307334 A1 | 10/2016 | Dos Santos Mendonca | |
| 2017/0131718 A1 | 5/2017 | Matsumura | |
| 2017/0201735 A1 | 7/2017 | Tyshchenko | |
| 2017/0206415 A1* | 7/2017 | Redden | G06T 7/593 |
| 2017/0294010 A1 | 10/2017 | Shen | |
| 2017/0294047 A1 | 10/2017 | Asakura | |
| 2017/0351933 A1 | 12/2017 | Bleiweiss | |
| 2017/0372221 A1 | 12/2017 | Krishnamurthy | |
| 2018/0211401 A1* | 7/2018 | Lee | G06T 7/593 |
| 2018/0224802 A1 | 8/2018 | Vasavada | |
| 2019/0124826 A1 | 5/2019 | Pickett | |
| 2019/0126308 A1 | 5/2019 | Hendrickson | |
| 2019/0128864 A1 | 5/2019 | Pickett | |
| 2019/0244428 A1 | 8/2019 | Greenberg | |
| 2019/0318502 A1 | 10/2019 | He | |
| 2020/0007847 A1 | 1/2020 | Redden | |
| 2020/0286282 A1 | 9/2020 | Grant | |
| 2020/0298117 A1 | 9/2020 | Yonezu | |
| 2021/0065393 A1 | 3/2021 | Jeon | |
| 2021/0103745 A1 | 4/2021 | Chakravarty | |
| 2021/0118132 A1 | 4/2021 | Kearney | |
| 2021/0127659 A1 | 5/2021 | Loukili | |
| 2021/0183014 A1 | 6/2021 | Fang | |
| 2021/0248446 A1 | 8/2021 | Hughes | |
| 2021/0353393 A1 | 11/2021 | Kearney | |
| 2021/0406336 A1 | 12/2021 | Tripathy | |
| 2022/0028102 A1 | 1/2022 | Chhabria | |
| 2022/0044044 A1* | 2/2022 | Peake | H04N 25/134 |
| 2022/0092423 A1 | 3/2022 | Chakaravarthy | |
| 2022/0117214 A1 | 4/2022 | Garner | |
| 2022/0117215 A1 | 4/2022 | Sibley | |
| 2022/0118555 A1 | 4/2022 | Sibley | |
| 2022/0132737 A1 | 5/2022 | Anderson | |
| 2022/0138925 A1 | 5/2022 | Anderson | |
| 2022/0138987 A1 | 5/2022 | Anderson | |
| 2022/0151161 A1 | 5/2022 | Humpston | |
| 2022/0156921 A1 | 5/2022 | Humpston | |
| 2022/0183208 A1 | 6/2022 | Sibley | |
| 2022/0207860 A1 | 6/2022 | Kiyama | |
| 2022/0222872 A1 | 7/2022 | Ghosh | |
| 2022/0373795 A1 | 11/2022 | Latapie | |
| 2022/0400620 A1 | 12/2022 | Makaram | |
| 2023/0043464 A1 | 2/2023 | Jifei | |
| 2023/0107444 A1 | 4/2023 | Anderson | |
| 2023/0127880 A1 | 4/2023 | Redden | |
| 2023/0135993 A1 | 5/2023 | Ichikawa | |
| 2023/0136563 A1 | 5/2023 | Zachary | |

OTHER PUBLICATIONS

Satyarth Praveen "Efficient Depth Estimation Using Sparse Stereo-Vision with Other Perception Techniques" IntechOpen. doi:http://dx.doi.org/10.5772/intechopen.86303. 20 pages.

Pon et al., "Object-Centric Stereo Matching for 3D Object Detection" arXiv:1909.07566v2 [cs.CV]. Dated Mar. 10, 2020. 7 pages.

Mayer et al., "A Large Dataset to Twain Convolutional Networks for Disparity, Optical Flow, and Scene Flow Estimation" arXiv:1512.02134v1 [cs.CV] dated Dec. 7, 2015, 14 pages.

Dosovitskiy et al., "CARLA: An Open Urban Driving Simulator" arXiv:1711.03938v1 [cs.LG] dated Nov. 10, 2017, 16 pages.

Mayer et al., "What Makes Good Synthetic Training Data For Learning Disparity and Optical Flow Estimation" arXiv:1801.06397v3 [cs.CV] dated Mar. 22, 2018, 24 pages.

Canessa et al., "Data Descriptor: A dataset of stereoscopic images and ground-truth disparity mimicking human fixations in peripersonal space" Scientific Data. Dated Mar. 28, 2017, 16 pages. DOI: 10.1038zsdata.2017.34.

Brekke et al., "Multimodal 3D Object Detection from Simulated Pretraining" arXiv:1905.07754v1 [cs.CV] dated May 19, 2019, 12 pages.

* cited by examiner

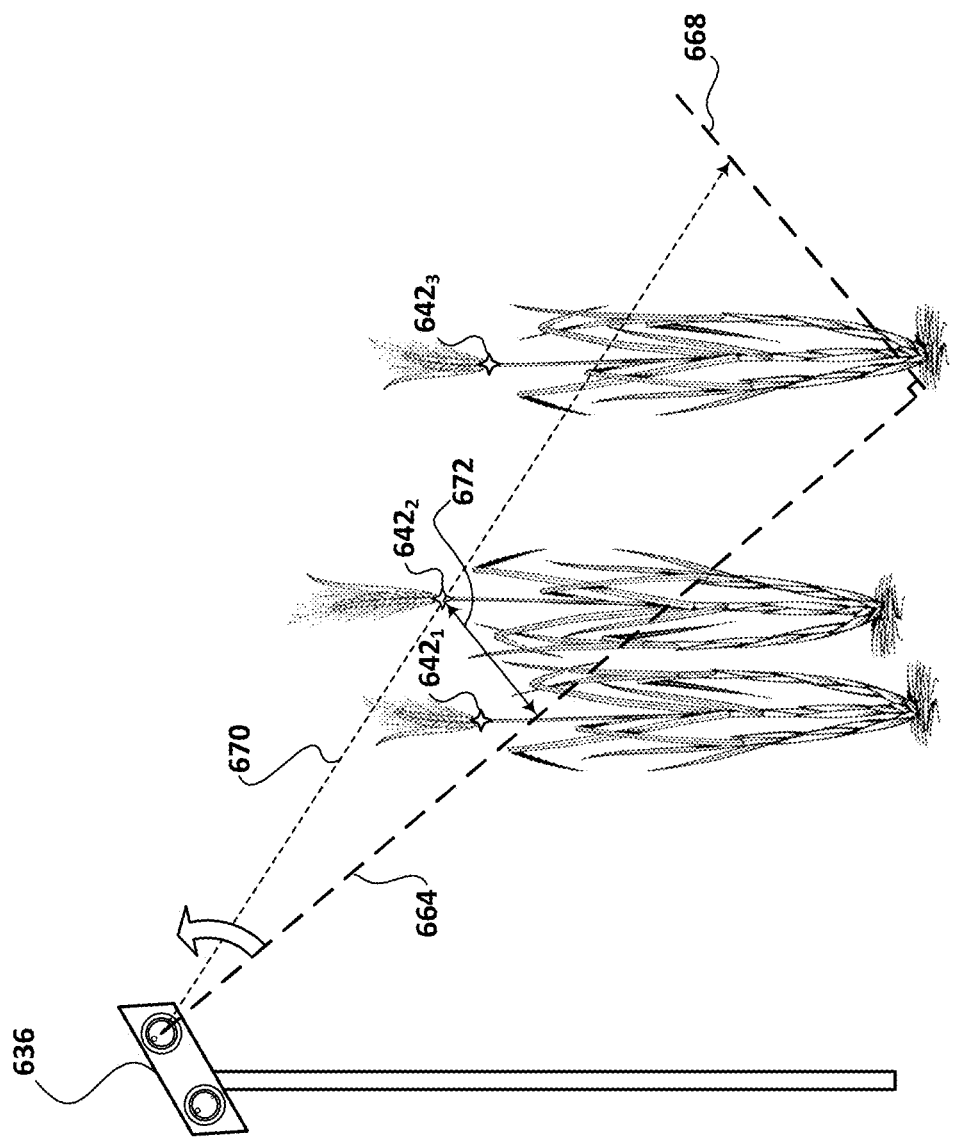

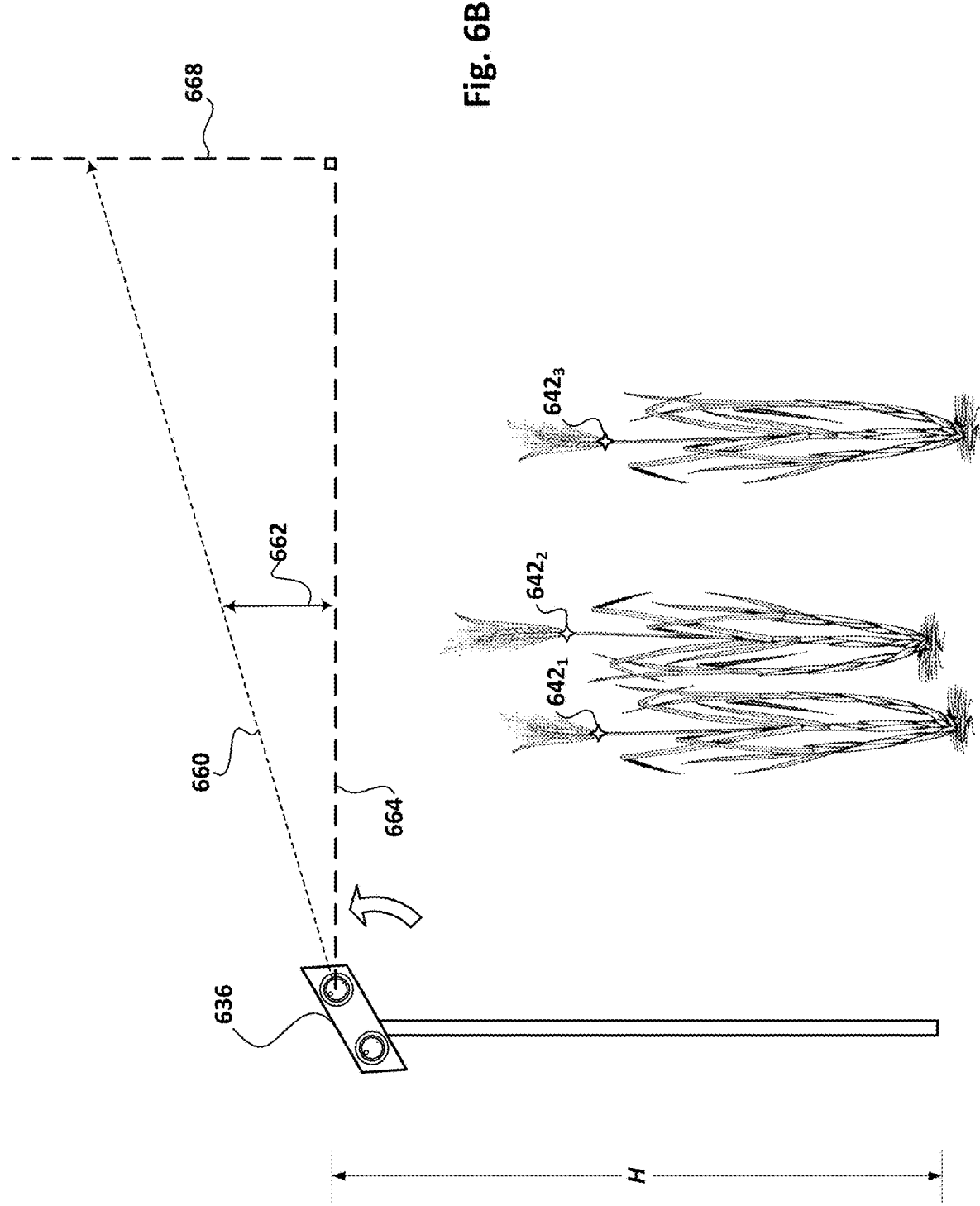

SPARSE DEPTH ESTIMATION FROM PLANT TRAITS

BACKGROUND

Stereoscopic cameras leverage multiple lenses (or images captured from multiple cameras from different perspectives) in order to create dense depth maps from two (or more) stereo images. In the computer vision context, this dense depth estimation can involve a considerable amount of computation, such as pixel-wise comparisons for visual feature matching and disparity calculation. This computation may require considerable computing resources such as processor cycles and memory, not to mention time. The more repetitive and homogeneous the visual features depicted in the two stereo images are, the more error-prone the process becomes e.g., due to mismatched visual features. This is not normally an issue in domains where visual features and/or noise are relatively sparse and/or heterogeneous but becomes problematic when visual features are abundant, densely-packed, and/or homogeneous. For example, conventional dense depth estimation generally performs poorly on fine structures and at the edges of objects.

In the agricultural domain, for example, increasingly large amounts of vision data are being captured, e.g., by agricultural robots or rovers, unmanned aerial vehicles (UAVs), and sensor packages transported through fields by agricultural vehicles. These often high-resolution vision data include close-up depictions of plants with enormous numbers of relatively homogenous and densely-packed visual features, such as leaves, blades, stems, branches, and/or other constituent plant parts. Performing conventional depth estimation on such vision data, e.g., on a pixel-by-pixel basis, may constitute an unacceptable bottleneck for farmers who rely on near real-time agricultural inferences to remain competitive.

SUMMARY

Implementations are described herein for performing sparse depth estimation in domains where visual features and/or noise are abundant. More particularly, but not exclusively, techniques are described herein for leveraging visual annotations of plant trait instances in stereo images to perform sparse depth estimation in the agricultural domain. In various implementations, instances of plant traits are visually annotated in pairs of stereo images. Rather than performing depth estimation using all pixels of the stereo images, sparse depth estimation is performed using attributes of the visual annotations themselves, including spatial attributes such as location, size, shape, height, width, distance(s) to other visual annotations, etc. Visual features outside of these annotated plant trait instances may not be relevant or useful to agricultural personnel. Accordingly, computationally-expensive and/or error-prone dense depth estimation can be reduced or avoided altogether.

In various implementations, a method for performing sparse depth estimation may be implemented using one or more processors and may include: comparing one or more spatial aspects of a first visual annotation of a first candidate plant trait instance depicted in a first stereo image to one or more spatial aspects of a second visual annotation of a second candidate plant trait instance depicted in a second stereo image; based on the comparing, determining that the first and second candidate plant trait instances are a match for the same plant trait instance across the first and second stereo images; determining a disparity between the first and second candidate plant trait instances; based on the disparity, estimating a depth associated with the same plant trait instance; and causing output to be provided at a computing device, wherein the output is generated based on the depth associated with the same plant trait instance.

In various implementations, the method may further include: comparing one or more spatial aspects of a third visual annotation of a third candidate plant trait instance depicted in the first stereo image to one or more spatial aspects of a fourth visual annotation of a fourth candidate plant trait instance depicted in the second stereo image; based on the comparing, determining that the third and fourth candidate plant trait instances are a match for an additional same plant trait instance across the first and second stereo images; and determining an additional depth associated with the additional same plant trait instance. The output may be further generated based on the additional depth.

In various implementations, the method may further include comparing the depth with the additional depth to determine a spatial dimension of a plant-part-of-interest, wherein the output conveys the spatial dimension of the plant-part-of-interest. In various implementations, the same plant trait instance may include one end of a head of wheat and the additional same plant trait instance comprises an opposite end of the head of wheat. In various implementations, the same plant trait instance may include one end of a pod and the additional same plant trait instance comprises an opposite end of the pod. In various implementations, the same plant trait instance may include one end of an ear or tassel of corn and the additional same plant trait instance comprises an opposite end of the ear or tassel of corn.

In various implementations, the method may include matching one or more additional phenotypic traits of a plant depicted in the first stereo image having the first candidate plant trait instance to one or more additional phenotypic traits of a plant depicted in the second stereo image having the second candidate plant trait instance, wherein the determining that the first and second candidate plant instances are a match is further based on the matching. In various implementations, the first and second visual annotations may include bounding boxes or key points. In various implementations, the same plant trait instance may be a flower, nut, fruit, or berry.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 6A and FIG. 6B demonstrate one example of how stereo imagery captured by a stereoscopic camera deployed in a field can be processed to perform sparse depth estimation, which in turn can be used to estimate plant height.

DETAILED DESCRIPTION

Figure 1:
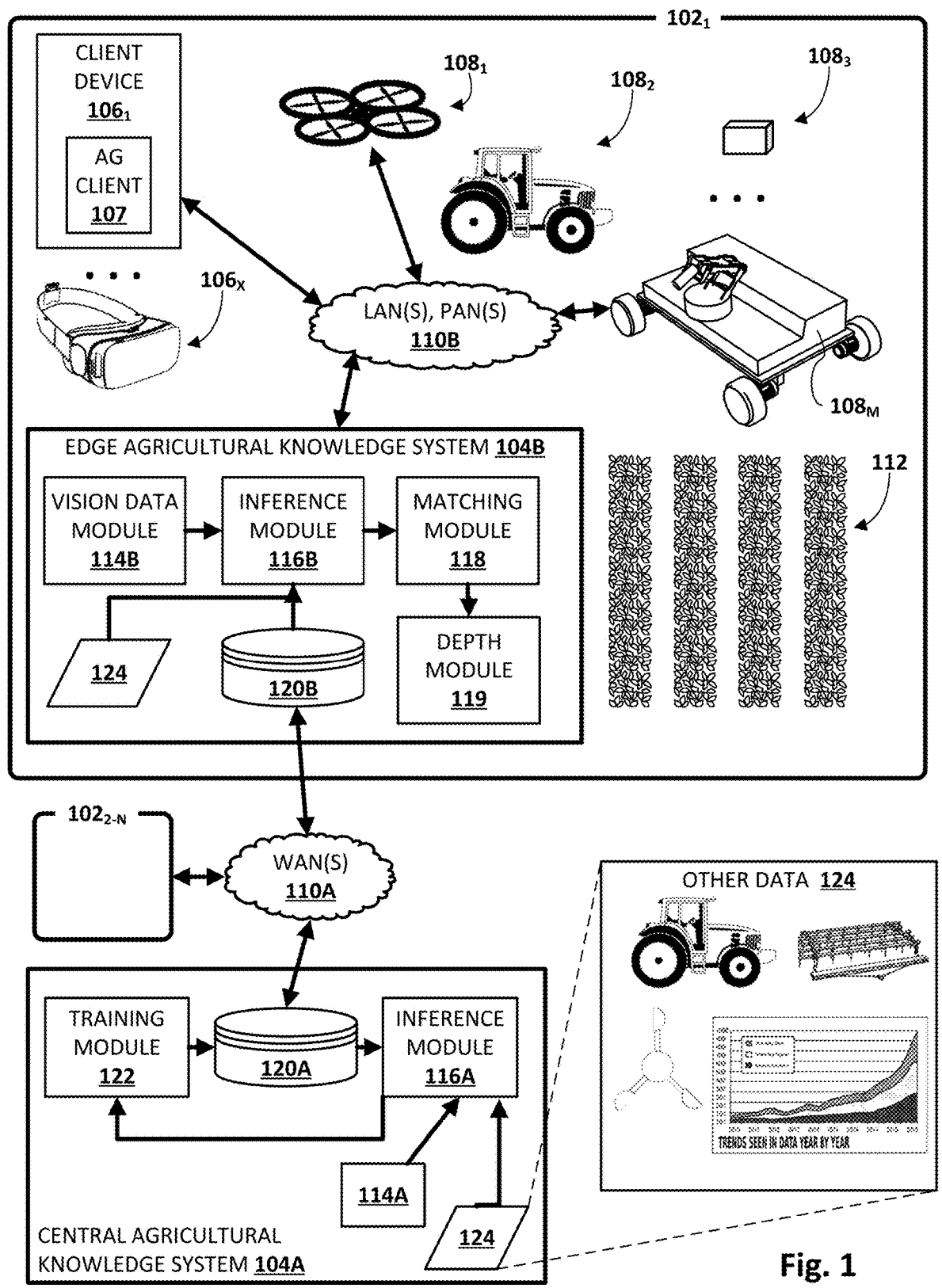
FIG. 1 schematically depicts an example environment in which selected aspects of the present disclosure may be employed in accordance with various implementations.

Implementations are described herein for performing sparse depth estimation in domains where visual features and/or noise are abundant. More particularly, but not exclusively, techniques are described herein for leveraging visual annotation of plant trait instances in stereo images to perform sparse depth estimation in the agricultural domain. In various implementations, instances of plant traits are visually annotated in pairs of stereo images. Rather than performing depth estimation using all pixels of the stereo images, sparse depth estimation is performed using attributes of the visual annotations themselves, including spatial attributes such as location, size, shape, height, width, distance(s) to other visual annotations, etc. Visual features outside of these annotated plant trait instances may not be relevant or useful to agricultural personnel. Accordingly, computationally-expensive and/or error-prone dense depth estimation can be reduced or avoided altogether.

Various plant traits may be leveraged to perform sparse depth estimation, depending on the task at hand. These plant traits may include, for instance, location and/or attributes of plant-parts-of economic and/or nutritional interest, locations of particular plant "landmarks" such as the top/bottom of a head of wheat or locations of laterally-extending branches, location of disease or pest infestation, particular plant types (e.g., weeds), and so forth. Plant traits may be identified using various object recognition techniques, such as scale-invariant feature transform (SIFT), speeded up robot feature (SURF), histogram of oriented gradients (HOG), single shot detectors (SSD), spatial pyramid pooling (SPP), you only look once (YOLO), etc. In some implementations, a machine learning model such as a convolutional neural network (CNN) may be used to process pairs of stereo images to identify objects. The output of such object recognition processing may be visual annotations of those images. These visual annotations may include, for instance, key points or bounding shapes, to name a few.

In various implementations, spatial aspect(s) of a visual annotation may be compared across a pair of stereo images to identify matching pairs of visual annotations that annotate the same plant trait instance. For example, locations of key points, by themselves and relative to other visual annotation(s), may be compared to identify matching key points across pairs of stereo images. With bounding shapes such as bounding boxes, height, width, and/or area may also be considered. With pixel-wise annotations, attributes of clusters of annotated pixels may be considered, such as cluster shapes, cluster diameters, cluster skews, etc. Once matching pairs of visual annotations are identified, pixel disparities between those matching pairs of visual annotations may be determined across the pair of stereo images.

A matching pair of visual annotations and the disparit(ies) between them across a pair of stereo images may be used to estimate a depth associated with the plant trait instance that is annotated by the visual annotations. This depth may be coupled with other data points, such as horizontal (x) and vertical (y) coordinates of the stereo imagery, focal length(s), etc., to represent a coordinate in 3D space. Such a 3D coordinate may then be used for various purposes. As one example, the depth associated with the plant trait instance may be compared to a distance to ground to determine a height of the plant trait instance, which may be predictive of, for instance, crop yield, plant health, etc. In some implementations, a sparse depth map may be generated that includes depths for plant traits of potential interest, as opposed to a dense depth map that includes pixel-wise depths.

As another example, a 3D coordinate (including the estimated depth) associated with one plant trait instance may be compared with another 3D coordinate associated with another plant trait instance, e.g., to determine a spatial dimension of one or more plant-parts-of-interest. In some implementations where each plant trait instance is an instance of a plant-part-of interest (e.g., a nut, berry, flower, etc.), distances between each instance may be determined, e.g., as a distribution of distances between plant-parts-of-interest, to estimate a density or other quantitative measure of the plant-part-of-interest, a general health of the plant, etc.

In other implementations, each plant trait may correspond to a landmark of a plant that can be used for various purposes. For example, one plant trait may be the top of a head of wheat and another plant trait may be a bottom end (or opposite end) of the head of wheat. Instances of these two plant traits may be annotated, e.g., with key points. Techniques described herein may be used to determine 3D coordinates of these plant trait instances based on those annotations. The 3D coordinates may be used to determine a distance between these plant trait instances. That distance may correspond to the size of the plant trait. Thus, it is possible to quickly estimate the size of heads of wheat, or other similar plant traits such as ears or tassels of corn, pods carrying various contents (e.g., beans, peas), and so forth.

FIG. 1 schematically illustrates one example environment in which one or more selected aspects of the present disclosure may be implemented, in accordance with various implementations. The example environment depicted in FIG. 1 relates to the agriculture domain, which as noted previously is a beneficial domain for implementing selected aspects of the present disclosure. For example, techniques described herein may be useful where there are abundant, densely-packed, and/or homogeneous clusters of visual features, but actual plant-traits-of-interest are less abundant (e.g., detecting heads of wheat among a background of leaves). Techniques described herein are also useful where traits of interest are very small, thin, or otherwise fine. Conventional dense depth estimation (e.g., pixel-wise) generally performs poorly on fine structures and at the edges of objects. However, it may be desirable to detect the height or distances at precisely these points (e.g., the bottom of a wheat head where the stem is very fine and thin, or the distance between one edge of a crop and the other edge to get its length). However, this is not meant to be limiting. Techniques described here may be useful in any domain where visual features are abundant, densely-packed, and/or homogeneous.

The environment of FIG. 1 includes a plurality of edge sites $102_{1-N}$ (e.g., farms, fields, plots, or other areas in which crops are grown) and a central agricultural knowledge system 104A. Additionally, one or more of the edge sites 102, including at least edge site $102_1$, includes an edge agricultural knowledge system 104B, a plurality of client devices $106_{1-X}$, human-controlled and/or autonomous farm equipment $108_{1-M}$, and one or more fields 112 that are used to grow one or more crops. Field(s) 112 may be used to grow various types of crops that may produce plant parts of economic and/or nutritional interest. These crops may include but are not limited to everbearing crops such as strawberries, tomato plants, or any other everbearing or non-everbearing crops, such as soybeans, corn, lettuce, spinach, beans, cherries, nuts, cereal grains, wheat, berries, grapes, sugar beets, and so forth.

One edge site $102_1$ is depicted in detail in FIG. 1 for illustrative purposes. However, as demonstrated by additional edge sites $102_{2-N}$, there may be any number of edge sites 102 corresponding to any number of farms, fields, or other areas in which crops are grown, and in which large-scale agricultural tasks such as harvesting, weed remediation, fertilizer application, herbicide application, planting, tilling, etc. are performed. Each edge site 102 may include the same or similar components as those depicted in FIG. 1 as part of edge site $102_1$.

In various implementations, components of edge sites $102_{1-N}$ and central agricultural knowledge system 104A collectively form a distributed computing network in which edge nodes (e.g., client device 106, edge agricultural knowledge system 104B, farm equipment 108) are in network communication with central agricultural knowledge system 104A via one or more networks, such as one or more wide area networks ("WANs") 110A. Components within edge site $102_1$, by contrast, may be relatively close to each other (e.g., part of the same farm or plurality of fields in a general area), and may be in communication with each other via one or more local area networks ("LANs", e.g., Wi-Fi, Ethernet, various mesh networks) and/or personal area networks ("PANs", e.g., Bluetooth), indicated generally at 110B.

An individual (which in the current context may also be referred to as a "user") may operate a client device 106 to interact with other components depicted in FIG. 1. Each client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") that provides an AR or VR immersive computing experience, a "smart" watch, and so forth. Additional and/or alternative client devices may be provided.

Central agricultural knowledge system 104A and edge agricultural knowledge system 104B (collectively referred to herein as "agricultural knowledge system 104") comprise an example of a distributed computing network for which techniques described herein may be particularly beneficial. Each of client devices 106, agricultural knowledge system 104, and/or farm equipment 108 may include one or more memories for storage of data and software applications, one or more processors for accessing data and executing applications, and other components that facilitate communication over a network. The computational operations performed by client device 106, farm equipment 108, and/or agricultural knowledge system 104 may be distributed across multiple computer systems.

Each client device 106 and some farm equipment 108 may operate a variety of different applications that may be used, for instance, to perform sparse depth estimation using techniques described herein. For example, a first client device $106_1$ operates an agricultural (AG) client 107 (e.g., which may be standalone or part of another application, such as part of a web browser) that may allow the user to, among other things, view depth maps generated using techniques described herein. Another client device $106_X$ may take the form of a HMD that is configured to render 2D and/or 3D data to a wearer as part of a VR immersive computing experience. For example, the wearer of client device $106_X$ may be presented with 3D point clouds representing various aspects of objects of interest, such as fruit/vegetables of crops, weeds, crop yield predictions, etc. The wearer may interact with the presented data, e.g., using HMD input techniques such as gaze directions, blinks, etc.

Individual pieces of farm equipment $108_{1-M}$ may take various forms. Some farm equipment 108 may be operated at least partially autonomously, and may include, for instance, an unmanned aerial vehicle $108_1$ that captures sensor data such as digital images from overhead field(s) 112. Other autonomous farm equipment (e.g., robots) may include a robot (not depicted) that is propelled along a wire, track, rail or other similar component that passes over and/or between crops, a wheeled robot $108_M$, or any other form of robot capable of being propelled or propelling itself past crops of interest. In some implementations, different autonomous farm equipment may have different roles, e.g., depending on their capabilities. For example, in some implementations, one or more robots may be designed to capture data, other robots may be designed to manipulate plants or perform physical agricultural tasks, and/or other robots may do both. Other farm equipment, such as a tractor $108_2$, may be autonomous, semi-autonomous, and/or human-driven. Any of farm equipment 108 may include various types of sensors, such as vision sensors (e.g., 2D digital cameras, 3D cameras, 2.5D cameras, infrared cameras), inertial measurement unit ("IMU") sensors, Global Positioning System ("GPS") sensors, X-ray sensors, moisture sensors, barometers (for local weather information), photodiodes (e.g., for sunlight), thermometers, etc.

In some implementations, farm equipment 108 may take the form of one or more modular edge computing nodes $108_3$. An edge computing node $108_3$ may be a modular and/or portable data processing device and/or sensor package that may be carried through an agricultural field 112, e.g., by being mounted on another piece of farm equipment (e.g., on a boom affixed to tractor $108_2$ or to a truck) that is driven through field 112 and/or by being carried by agricultural personnel. Edge computing node $108_3$ may include logic such as processor(s), application-specific integrated circuits (ASICs), field-programmable gate arrays (FPGA), etc., configured with selected aspects of the present disclosure to capture and/or process various types of sensor data to make agricultural inferences, and/or to perform sparse depth estimation.

In some examples, one or more of the components depicted as part of edge agricultural knowledge system 104B may be implemented in whole or in part on a single edge computing node $108_3$, across multiple edge computing nodes $108_3$, and/or across other computing devices, such as client device(s) 106. Thus, when operations are described herein as being performed by/at edge agricultural knowledge system 104B, or as being performed "in situ," it should be understood that those operations may be performed by one or more edge computing nodes $108_3$, and/or may be performed by one or more other computing devices at the edge 102, such as on client device(s) 106.

In various implementations, edge agricultural knowledge system 104B may include a vision data module 114B, an edge inference module 116B, a matching module 118, and a depth module 119. Edge agricultural knowledge system 104B may also include one or more edge databases 120B for storing various data used by and/or generated by modules 114B, 116B, 118, and 119 such as vision and/or other sensor data gathered by farm equipment $108_{1-M}$, agricultural inferences, machine learning models that are applied and/or trained using techniques described herein to generate agricultural inferences, depth estimations and/or depth maps calculated by depth module 119, and so forth. In some implementations one or more of modules 114B, 116B, 118, and/or 119 may be omitted, combined, and/or implemented in a component that is separate from edge agricultural knowledge system 104B.

In various implementations, central agricultural knowledge system 104A may be implemented across one or more computing systems that may be referred to as the "cloud." Central agricultural knowledge system 104A may receive massive sensor data generated by farm equipment $108_{1-M}$ (and/or farm equipment at other edge sites $102_{2-N}$) and process it using various techniques, including but not limited to application of machine learning state machines generated using techniques described herein, to make agricultural inferences.

However, the agricultural inferences generated by central agricultural knowledge system 104A may be delayed, e.g., by the time required to physically transport portable data devices (e.g., hard drives) from edge sites $102_{1-N}$ to central agricultural knowledge system 104A, and/or by the time required by central agricultural knowledge system 104A to computationally process this massive data. Agricultural personnel (e.g., farmers) at edge sites 102 may desire agricultural information, such as depth estimations and/or maps generated using techniques described herein, much more quickly than this. Moreover, farmers may value the privacy of their data and may prefer that their data not be sent to the cloud for processing. Accordingly, in various implementations, techniques described herein for sparse depth estimation may be implemented in situ at edge agricultural knowledge system 104B if possible/feasible, and at central agricultural knowledge system 104A if necessary/beneficial. Although not depicted identical to edge agricultural knowledge system 104B, central agricultural knowledge system 104A may include the same or similar components as edge agricultural knowledge system 104B.

In some implementations, vision data module 114B may be configured to provide sensor data to edge inference module 116B. In some implementations, the vision sensor data may be applied, e.g., continuously and/or periodically by edge inference module 116B, as input across one or more machine learning models stored in edge database 120B to generate inferences detected in/on one or more plants in the agricultural field 112. Inference module 116B may process the inference data in situ at the edge using one or more of the machine learning models stored in database 120B. In some cases, one or more of these machine learning model(s) may be stored and/or applied directly on farm equipment 108, such as edge computing node $108_3$, to make inferences about plants of the agricultural field 112.

As noted previously, various types of machine learning models may be applied by inference modules 116A/B to generate various types of agricultural inferences (e.g., object recognition, classification, disease detection, pest detection, etc.). Additionally, various types of machine learning models may be used to generate image embeddings that are applied as input across the various machine learning models. These various models may include, but are not limited to, various types of recurrent neural networks (RNNs) such as long short-term memory (LSTM) or gated recurrent unit (GRU) networks, transformer networks, feed-forward neural networks, CNNs, support vector machines, random forests, decision trees, etc.

Additionally, other data 124 may be applied as input across these models besides sensor data or embeddings generated therefrom. Other data 124 may include, but is not limited to, historical data, weather data (obtained from sources other than local weather sensors), data about chemicals and/or nutrients applied to crops and/or soil, pest data, crop cycle data, previous crop yields, farming techniques employed, cover crop history, and so forth. Weather data may be obtained from various sources other than sensor(s) of farm equipment 108, such as regional/county weather stations, etc. In implementations in which local weather and/or local weather sensors are not available, weather data may be extrapolated from other areas for which weather data is available, and which are known to experience similar weather patterns (e.g., from the next county, neighboring farms, neighboring fields, etc.).

Matching module 118 may be configured to compare one or more spatial aspects of a first visual annotation of a first candidate plant trait instance depicted in a first stereo image, e.g., provided by vision data module 114B, to one or more spatial aspects of a second visual annotation of a second candidate plant trait instance depicted in a second stereo image, e.g., provided by vision data module 114B. In various implementations, the first and second stereo images may be captured by multiple lenses of a single stereoscopic camera, or by the same camera from two different perspectives. Based on this comparison, matching module 118 may determine whether the first and second candidate plant trait instances are a match for the same plant trait instance across the first and second stereo images.

Matching module 118 may compare and match visual annotations in various ways, depending on factors such as the type of annotations used. For example, key points, which each may comprise a single point (e.g., a pixel of a digital image) may be compared on the basis of their relative locations across the stereo images, locations within clusters of key points, etc. Bounding shapes such as bounding boxes, by contrast, may be compared not only based on their relative locations across stereo images, but also based on their relative sizes, heights, widths, etc. In some implementations where each stereo image contains multiple candidate visual annotations, techniques such as bipartite graph matching (e.g., using the Hungarian algorithm) may be employed to match visual annotations across stereo images.

Depth module 119 may be configured to generate depth information about the matched plant traits. This depth information may include, for instance, updated visual annotations that include depths, a depth distribution (e.g., in numeric or graphical form), statistics, and/or a depth map. To generate this depth information, in various implementations, depth module 119 may be configured to determine a disparity (sometimes referred to as a "binocular disparity") between the matched first and second candidate plant trait instances. As used herein, disparity may refer to a shift or difference in apparent position (e.g., a parallax) between matching features across pairs of stereo images. This shift or difference may be horizontal if the lenses/cameras are offset from each other horizontally, or it may be vertical if the lenses/cameras are offset from each other vertically. Disparity may be measured and/or expressed in various ways, such as in units such as pixels, inches, centimeters, millimeters, etc.

Based on the disparity, depth module 119 may estimate a depth associated with the same plant trait instance, e.g., using techniques such as triangulation. In some implementations, for a given visual feature, depth module 119 may estimate its depth z using an equation such as the following:

$$z = \frac{f \times B}{d} \quad (1)$$

where f is the focal length of the stereoscopic vision sensor, B is the interaxial distance between the lenses/cameras, and d is the disparity in pixels.

In this specification, the term "database" and "index" will be used broadly to refer to any collection of data. The data of the database and/or the index does not need to be structured in any particular way and it can be stored on storage devices in one or more geographic locations. Thus, for example, database(s) 120A and 120B may include multiple collections of data, each of which may be organized and accessed differently.

Figure 2:
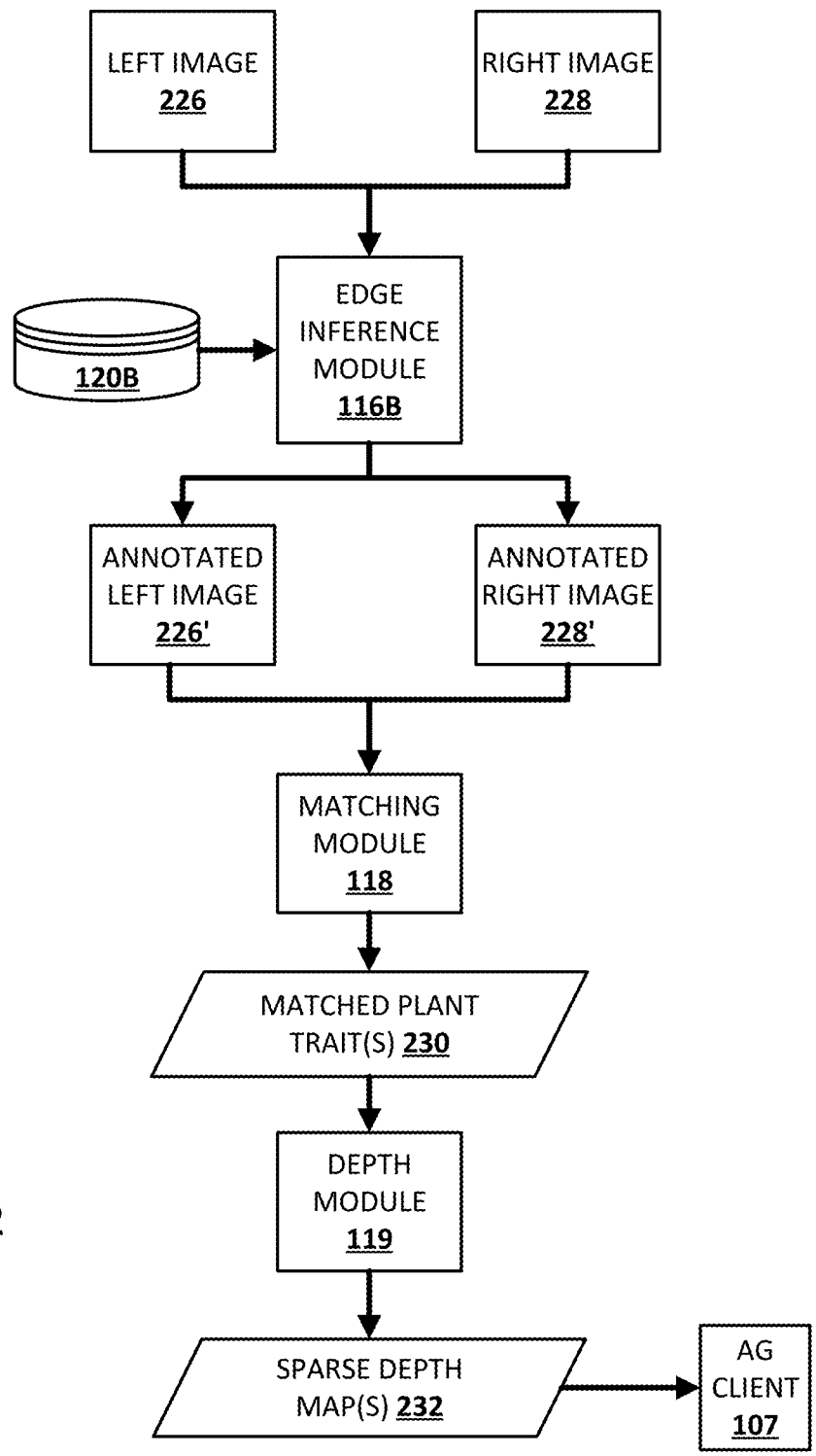
FIG. 2 schematically depicts components and a process for practicing selected aspects of the present disclosure, in accordance with various implementations.

FIG. 2 schematically depicts how various elements depicted in FIG. 1 may process data to practice selected aspects of the present disclosure. Starting at top, a left stereo image 226 and a right stereo image 228 may be captured using a stereoscopic vision sensor. Left stereo image 226 may capture crops in field 112 from a first perspective. Right stereo image 228 may capture crops in field 112 from a second perspective that is offset from the first perspective, e.g., by an interaxial distance.

Edge inference module 116B may separately process stereo images 226, 228 (e.g., in parallel, one after the other) using one or more machine learning models stored in database 120B to generate an annotated left stereo image 226' and an annotated right stereo image 228'. In particular, these images 226', 228' may be annotated with visual annotations such as key points, bounding boxes, pixel-wise annotations, etc. of various plant traits. Inference module 116B may use various types of machine learning models for this purpose, such as various types of CNNs trained to detect/annotate various plant traits. In other implementations, other object detection techniques may be employed, such as SIFT, SURF, HOG, SSD, SPP, YOLO, etc.

Matching module 118 may be configured to compare the visual annotations contained in annotation stereo images 226', 228' to identify matching visual annotations, and hence, matched underlying plant trait(s) 230. As noted previously, matching module 118 may employ various techniques to perform this matching, such as bipartite graph matching, brute force matching, fast library for approximate nearest neighbors (FLANN) matching, etc. In some implementations, matching module 118 may encode visual annotations (and in some cases the pixels they envelop) into embeddings or feature vectors. Matching module 118 may then compare these embeddings in embedding space to determine similarity measures, e.g., using techniques such as Euclidean distance, cosine similarity, dot product, etc.

The matched plant trait(s) 230 may be used by depth module 119 to determine disparities (e.g., a disparity map) between various visual features. As discussed previously, depth module 119 may calculate depth(s) of the matched plant trait(s) 230 using various techniques such as triangulation, equation (1) above, etc. In some implementations, depth module 119 may generate sparse depth map(s) 232 of the various matched plant trait(s) 230. These depth map(s) may be provided to AG client 107, which may output them to a user in various ways.

In some implementations, AG client 107 may render a composite or 3D view generated from both stereo images 226, 228. The composite view may include annotations of matched plant traits, e.g., denoted with respective depths. In some implementations, AG client 107 may provide a graphical user interface (GUI) that allows a user to select which plant traits and corresponding depths they wish to view, e.g., akin to activating or deactivating layers. For example, the user may interact with one or more graphical elements to select plant traits such as flowers, buds, nuts, landmarks (e.g., tops/bottoms of pods, heads of wheat, ears of corn) that the user wishes to see visualized. In some such implementations, statistics associated with each type of plant trait may be displayed as well. These statistics may vary widely depending on the application, and may include, for instance, mean/median heights of plant traits, density of plant traits, mean/median sizes of plant traits, etc.

Figure 3:
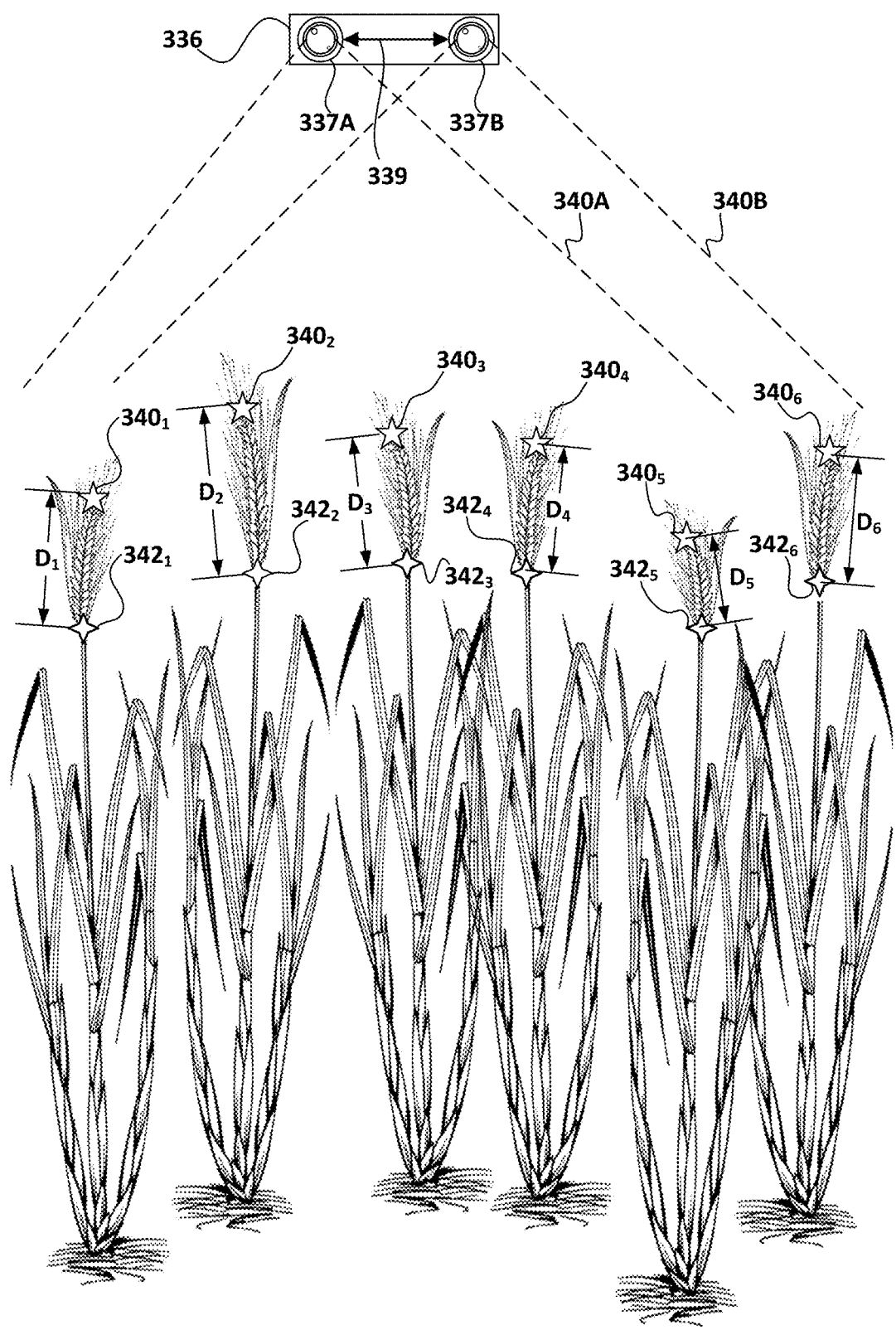
FIG. 3 depicts an example of how various visual annotations may be used to perform sparse depth estimation, in accordance with various implementations.

FIG. 3 depicts an example of how annotations of stereo images of crops may be used to perform sparse depth estimation. In this example, the crops at issue are wheat plants, but this is not meant to be limiting. Similar techniques may be applied to other types of crops, such as corn (maize), various types of peas or beans, legumes, etc. A stereoscopic vision sensor 336 includes two lenses, 337A and 337B, that are separated by an interaxial distance 339. Lenses 337A, 337B capture respective fields of view 340A, 340B that are slightly offset from each other due to interaxial distance 339.

Stereoscopic vision sensor 336 is overhead the wheat plants so stereo images it generates would depict the wheat plants from overhead. For example, stereoscopic vision sensor 336 may be integrated with a computing node $108_3$ that is mounted to a boom of a tractor or to a center pivot deployed in field 112. However, for ease of explanation and understanding, the wheat plants are shown from the side in FIG. 3. To this end, the wheat plants are shown with annotations included at 3D locations that correspond to landmarks of those plants. For example, tops of the heads of wheat are annotated with five-pointed stars at $340_{1-6}$. In the stereo images generated by stereoscopic vision sensor 336, these annotations would more likely be key points than actual stars; stars are used here for demonstration purposes. Likewise, bottoms of the heads of wheat are annotated with four-point stars at $342_{1-6}$.

In various implementations, these landmarks may be used for a variety of purposes. As explained previously, they may be presented to a user of AG client 107, e.g., as selectable layers that the user can toggle on/off. Statistics about these landmarks may be provided as well. For example, a distribution of the wheat head tops $340_{1-6}$ may be presented and/or used to present statistics such as an average wheat head height, a standard deviation, etc.

In some implementations, multiple visual annotations of different plant traits may be used in tandem to make additional agricultural estimations about combined or aggregated plant traits. For example, each of annotations $340_{1-6}$ and $340_{1-6}$ represents a point in 3D space that is some measured depth from stereoscopic vision sensor 336. Distances between these points may be representative of the spatial dimension(s) of the heads of wheat. For example, the distance $D_1$ between annotations $340_1$ and $342_1$ may represent a length of the left-most head of wheat. The distance $D_2$ between annotations $340_2$ and $342_2$ may represent a length of the second-from-left head of wheat. And so on. Once distances $D_{1-6}$ are computed, they may be used, for instance, to provide statistics about spatial dimensions of wheat heads, such as average length, median length, average mass, etc.

In some implementations, other phenotypic traits of a plant and/or plant-part-of-interest may be used in conjunction with visual annotation(s) for various purposes. For example, to match key points at the top and bottom of a particular head of wheat, another phenotypic trait about the head of wheat, such as its maturity rating (the stem just below the head of wheat begins turning brown once it reaches full maturity), color, moisture content, thickness, etc., may be leveraged. In particular, two key points may be determined to be associated with different heads of wheat if one key point is associated with a first head of wheat having a first maturity rating, and the other key point is associated with a second head of wheat having a different maturity rating.

Figure 4:
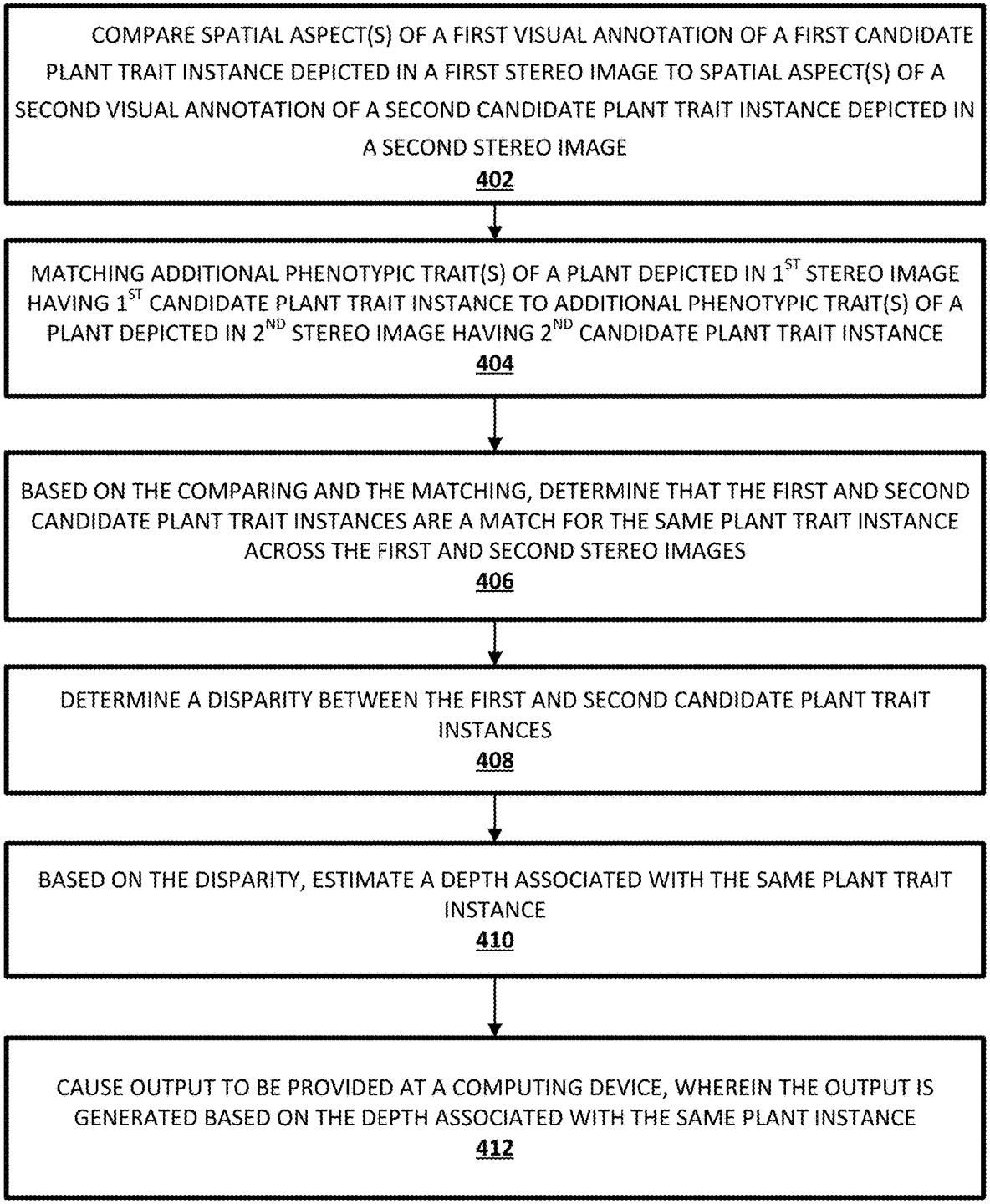
FIG. 4 is a flowchart of an example method in accordance with various implementations described herein.

FIG. 4 illustrates a flowchart of an example method 400 of sparse depth estimation. The operations of FIG. 4 can be performed by one or more processors, such as one or more processors of the various computing devices/systems described herein, such as by agricultural knowledge system 104, particularly edge agricultural knowledge system 104B. For convenience, operations of method 400 will be described as being performed by a system configured with selected aspects of the present disclosure. Other implementations may include additional operations than those illustrated in FIG. 4, may perform step(s) of FIG. 4 in a different order and/or in parallel, and/or may omit one or more of the operations of FIG. 4.

At block 402, the system, e.g., by way of matching module 118, may compare one or more spatial aspects of a first visual annotation of a first candidate plant trait instance depicted in a first stereo image (e.g., 226) to one or more spatial aspects of a second visual annotation of a second candidate plant trait instance depicted in a second stereo image (e.g., 228). For example, matching module 118 may compare a width, height, area, and/or location of a bounding box in the first stereo image to corresponding spatial aspects of one or more candidate bounding boxes in the second stereo image.

In some implementations where each stereo image includes multiple visual annotations, matching module 118 may use bipartite graph matching to identify matching visual annotations. In some implementations, the edges of such a graph may correspond to similarity measures. In some implementations, those similarity measures (or similarity measures used outside of bipartite matching) may correspond to Euclidean distances or cosine similarities between embeddings generated from the visual annotations and/or the pixels they annotate.

Back to FIG. 4, at block 404, the system may match one or more additional phenotypic traits of a plant depicted in the first stereo image having the first candidate plant trait instance to one or more additional phenotypic traits of a plant depicted in the second stereo image having the second candidate plant trait instance. This additional matching may be used as an additional matching signal to increase the confidence that the plant trait instances are, in fact, matching. For example, two different fruits may be at similar locations and may have similar sizes, which would lead to their bounding shape annotations having similar spatial aspects, and hence, being difficult to disambiguate. However, one of the fruits may be ripe (or mature, moist, etc.) whereas the other may be unripe. In such a case, annotations associated with the ripe fruit may be matched to each other and annotations associated with the unripe fruit may be matched to each other. At block 406, based on the comparing of block 402 and the matching of block 404, matching module 118 may determine that the first and second candidate plant trait instances are a match for the same plant trait instance across the first and second stereo images.

At block 408, the system, e.g., by way of matching module 118 or depth module 119, may determine a disparity between the first and second candidate plant trait instances. For example, depth module 119 may identify a pixel displacement or shift between the matched visual annotation in the first stereo image and the matched visual annotation in the second stereo image. Based on the disparity, at block 410, the system may estimate a depth associated with the same plant trait instance, e.g., using triangulation, equation (1) above, etc.

At block 412, the system may cause output to be provided at a computing device, such as client device $106_1$. In various implementations, wherein the output may be generated based on the depth associated with the same plant trait instance. For example, the depth may be presented to the user as an addendum to the existing visual annotation. Additionally or alternatively, the depth may be presented to the user as part of a whole depth map that is presented to the user.

While not depicted in FIG. 4, in some implementations, the depth determined at block 410 may be used for other purposes. In various implementations, a depth map generated using techniques described herein may be used to dynamically adjust various hardware and/or software parameters of a vision sensor or another sensor affixed to an agricultural vehicle. For example, as a tractor carries computing node $108_3$ (with an integral stereoscopic vision sensor such as 336) through a field, a depth map/distribution of particular plant traits may be repeatedly and/or continuously generated and monitored. If that depth distribution becomes too skewed one way or another, edge agricultural knowledge system 104 may generate and issue command(s) to various sensors/devices to adjust parameters such as focal length or zoom. Similarly, if that depth distribution becomes noisy or the individual depths are associated with low confidence measures, other parameters may be adjusted as well, such as aperture speed, use of flash, framerate, resolution, etc.

Figure 5:
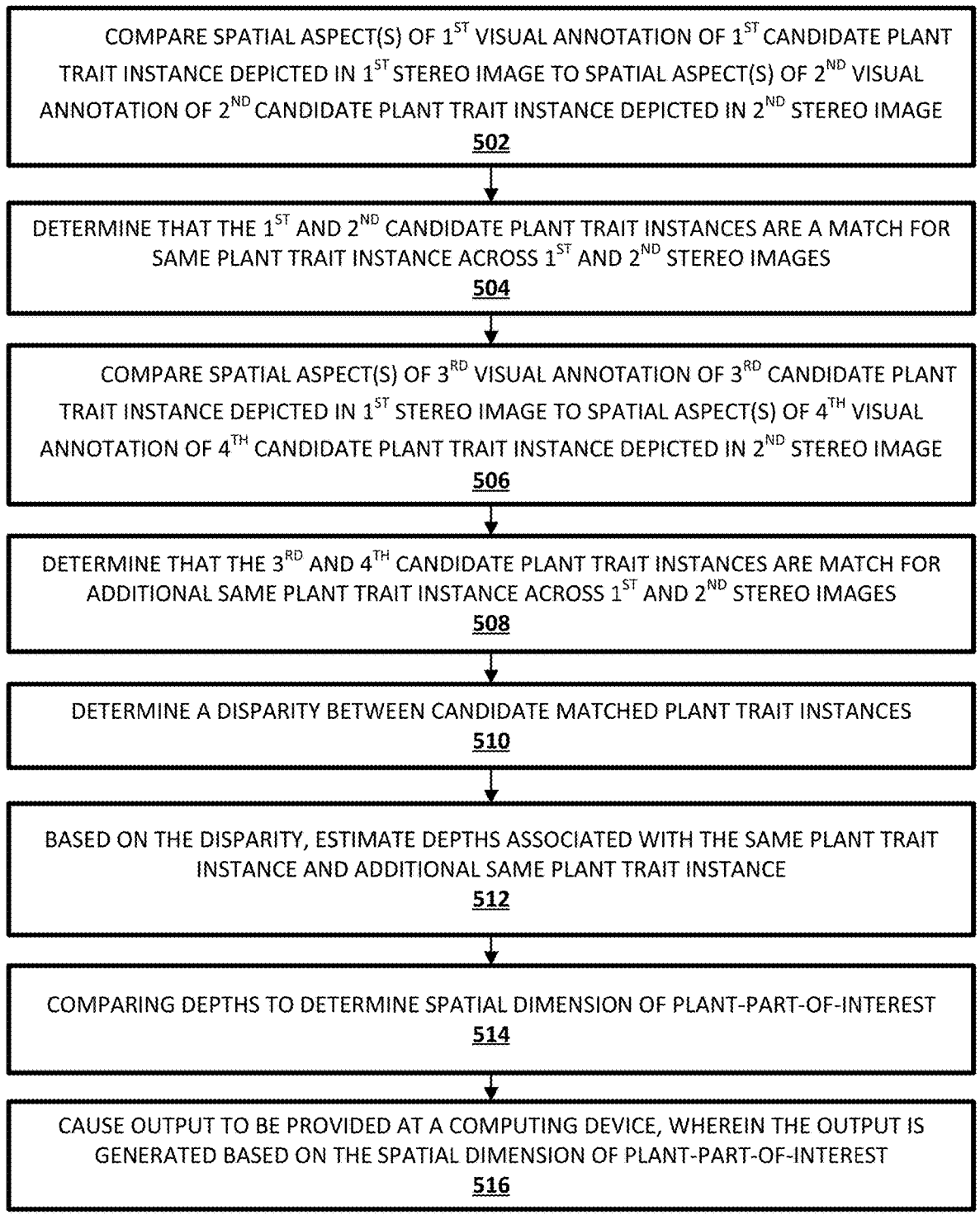
FIG. 5 is a flowchart of another example method in accordance with various implementations described herein.

FIG. 5 illustrates a flowchart of another example method 500 of sparse depth estimation. The operations of FIG. 5 can be performed by one or more processors, such as one or more processors of the various computing devices/systems described herein, such as by agricultural knowledge system 104, particularly edge agricultural knowledge system 104B. For convenience, operations of method 500 will be described as being performed by a system configured with selected aspects of the present disclosure. Other implementations may include additional operations than those illustrated in FIG. 5, may perform step(s) of FIG. 5 in a different order and/or in parallel, and/or may omit one or more of the operations of FIG. 5.

Many operations of method 500 are similar to those of method 400. For example, blocks 502-504 of method 500 may correspond to blocks 402 and 406 of method 400 (the matching of block 404 could be included in method 500 but is omitted in FIG. 5 for the sake of brevity). The difference is that in method 500, multiple plant traits are being considered in tandem to determine spatial attributes of plant-part-of-interest. For example, at block 506, the system, e.g., by way of matching module 118, may compare one or more spatial aspects of a third visual annotation (e.g., any of $340_{1-6}$ in FIG. 3) of a third candidate plant trait instance depicted in the first stereo image (e.g., 226) to one or more spatial aspects of a fourth visual annotation (e.g., any of $342_{1-6}$) of a fourth candidate plant trait instance depicted in a second stereo image (e.g., 228).

Similar to block 406 and 504, at block 508, the system, e.g., by way of matching module 118, may determine that the third and fourth candidate plant trait instances are a match for an additional same plant trait instance across the stereo images. And similar to block 408 of FIG. 4, at block 510, the system, e.g., by way of matching module 118 or depth module 119, may determine a disparity between matched plant trait instances.

Based on the disparity, at block 512, the system, e.g., by way of depth module 119, may estimate depths associated with the same plant trait instance and the additional same plant trait instance, similar to block 410 of FIG. 4. At block 514, the system, e.g., by way of depth module 119, may compare the depths to determine a spatial dimension of a plant-part-of-interest. In FIG. 3, for instance, the depth (or 3D coordinate) of the top 340 of a head of wheat may be compared to a depth (or 3D coordinate) of the bottom 342 of the head of wheat to determine a length of the head of wheat. At block 516, the system may cause output to be provided, wherein the output is generated based on the spatial dimension determined at block 514.

FIGS. 6A and 6B demonstrate one example of how stereo imagery captured by a stereoscopic camera 636 deployed in a field can be processed to perform sparse depth estimation, which in turn can be used to estimate plant height. In this example, stereoscopic camera 636 has a field of view that is tilted relative to the ground, such that a z-axis represented by dashed line 664 is at an oblique angle to the ground. A y-axis that is perpendicular to the z-axis 664 is represented by dashed line 668.

In this example, it can be assumed that the height of the plants are measured based on the exclusion of the wheat head (or tassel as the case may be). Accordingly, imagery captured by stereoscopic camera 636 is processed using a machine learning model such as a CNN to detect and annotate the bottoms of the wheat heads with key points $642_{1-3}$. Key points $642_{1-2}$ are associated with two plants that are at roughly similar distances along the z-axis 664 from stereoscopic camera 636, e.g., by virtue of their being in the same row of a field. The third plant associated with the key point $642_3$ is further away from stereoscopic camera 636 along the z-axis, e.g., because it belongs to a different row. A dashed arrow 670 is shown passing from one of the lenses of stereoscopic camera 636 through second key point $642_2$ to y-axis 668. Dashed arrow 670 illustrates how a y-coordinate of second key point $642_2$ corresponds to the double-headed arrow 672.

To determine a height of the second plant that corresponds to second key point $642_2$, and for illustrative purposes, the coordinate system (664, 668) depicted in FIG. 6A may be rotated such that z-axis 664 is parallel to the ground, and y-axis 668 is perpendicular to the ground, as indicated by the white arrow. The result is shown in FIG. 6B. In FIG. 6B, it becomes clear that the height of the second plant (excluding the wheat head) can be determined (using addition or subtraction depending on signs employed for the y-axis) based on y-coordinate 662 and a known height H of stereoscopic camera 636.

In addition, as noted above, agricultural imagery tends to be noisy and dense. To ease computational burden and/or to prevent a user from being inundated with too much information, in various implementations, a z-axis filter may be applied that excludes annotations outside of some range. For example, in FIGS. 6A-B, third key point (and other key points detected on plants in the same row) may be excluded from being presented to a user (or otherwise used) by virtue of its z-coordinates falling outside of some range of z-coordinates. This range of permissible z-coordinates may otherwise capture plants in the first row that contains the plants with key points $642_{1-2}$.

Figure 7:
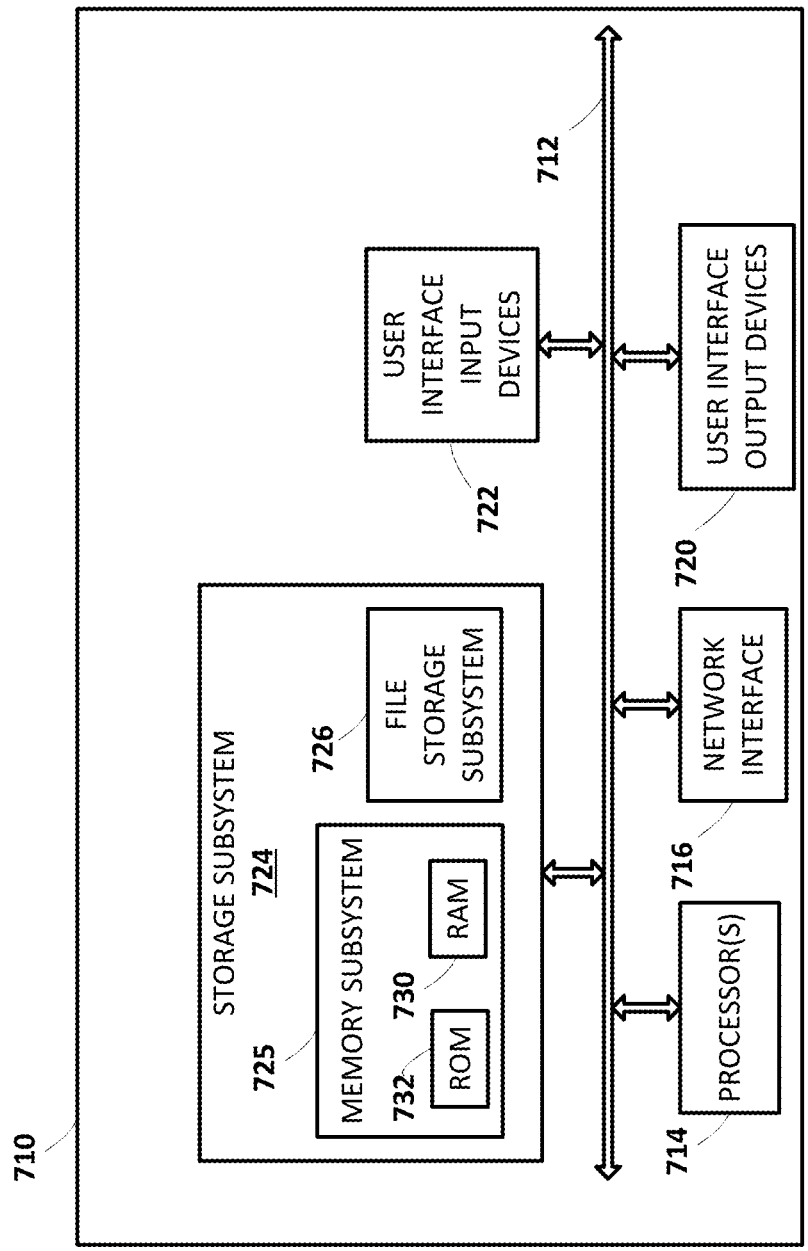
FIG. 7 schematically depicts an example architecture of a computer system.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touch screen incorporated into the display, audio input devices such as voice recognition systems, microphones, and/or other types of input devices. In some implementations in which computing device 710 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of methods 400 and 500 described herein, as well as to implement various components depicted in FIGS. 1 and 2.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD- ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for performing sparse depth estimation, the method implemented using one or more processors and comprising:
   comparing one or more spatial aspects of a first visual annotation of a first candidate plant trait instance depicted in a first stereo image to one or more spatial aspects of a second visual annotation of a second candidate plant trait instance depicted in a second stereo image;
   based on the comparing, determining that the first and second candidate plant trait instances are a match for the same plant trait instance across the first and second stereo images;
   determining a disparity between the first and second candidate plant trait instances;
   based on the disparity, estimating a depth associated with the same plant trait instance; and
   causing output to be provided at a computing device, wherein the output is generated based on the depth associated with the same plant trait instance.

2. The method of claim 1, further comprising:
   comparing one or more spatial aspects of a third visual annotation of a third candidate plant trait instance depicted in the first stereo image to one or more spatial aspects of a fourth visual annotation of a fourth candidate plant trait instance depicted in the second stereo image;
   based on the comparing, determining that the third and fourth candidate plant trait instances are a match for an additional same plant trait instance across the first and second stereo images; and
   determining an additional depth associated with the additional same plant trait instance;
   wherein the output is further generated based on the additional depth.

3. The method of claim 2, further comprising comparing the depth with the additional depth to determine a spatial dimension of a plant-part-of-interest, wherein the output conveys the spatial dimension of the plant-part-of-interest.

4. The method of claim 3, wherein the same plant trait instance comprises one end of a head of wheat and the additional same plant trait instance comprises an opposite end of the head of wheat.

5. The method of claim 3, wherein the same plant trait instance comprises one end of a pod and the additional same plant trait instance comprises an opposite end of the pod.

6. The method of claim 3, wherein the same plant trait instance comprises one end of an ear or tassel of corn and the additional same plant trait instance comprises an opposite end of the ear or tassel of corn.

7. The method of claim 1, further comprising matching one or more additional phenotypic traits of a plant depicted in the first stereo image having the first candidate plant trait instance to one or more additional phenotypic traits of a plant depicted in the second stereo image having the second candidate plant trait instance, wherein the determining that the first and second candidate plant instances are a match is further based on the matching.

8. The method of claim 1, wherein the first and second visual annotations comprise bounding boxes or key points.

9. The method of claim 1, wherein the same plant trait instance comprises a flower, nut, fruit, or berry.

10. A system for performing sparse depth estimation, the system comprising one or more processors and memory storing instructions that, in response to execution of the instructions, cause the one or more processors to:
    compare one or more spatial aspects of a first visual annotation of a first candidate plant trait instance depicted in a first stereo image to one or more spatial aspects of a second visual annotation of a second candidate plant trait instance depicted in a second stereo image;
    based on the comparison, determine that the first and second candidate plant trait instances are a match for the same plant trait instance across the first and second stereo images;
    determine a disparity between the first and second candidate plant trait instances;
    based on the disparity, estimate a depth associated with the same plant trait instance; and
    cause output to be provided at a computing device, wherein the output is generated based on the depth associated with the same plant trait instance.

11. The system of claim 10, further comprising instructions to:
- compare one or more spatial aspects of a third visual annotation of a third candidate plant trait instance depicted in the first stereo image to one or more spatial aspects of a fourth visual annotation of a fourth candidate plant trait instance depicted in the second stereo image;
- based on the comparison of the spatial aspects of the third and fourth visual annotations, determine that the third and fourth candidate plant trait instances are a match for an additional same plant trait instance across the first and second stereo images; and
- determine an additional depth associated with the additional same plant trait instance;
- wherein the output is further generated based on the additional depth.

12. The system of claim 11, further comprising instructions to compare the depth with the additional depth to determine a spatial dimension of a plant-part-of-interest, wherein the output conveys the spatial dimension of the plant-part-of-interest.

13. The system of claim 12, wherein the same plant trait instance comprises one end of a head of wheat and the additional same plant trait instance comprises an opposite end of the head of wheat.

14. The system of claim 12, wherein the same plant trait instance comprises one end of a pod and the additional same plant trait instance comprises an opposite end of the pod.

15. The system of claim 12, wherein the same plant trait instance comprises one end of an ear of corn and the additional same plant trait instance comprises an opposite end of the ear of corn.

16. The system of claim 10, wherein the first and second visual annotations comprise bounding boxes.

17. The system of claim 10, wherein the first and second visual annotations comprise key points.

18. The system of claim 10, wherein the same plant trait instance comprises a flower, nut, fruit, or berry.

19. A non-transitory computer-readable medium for performing sparse depth estimation the medium comprising instructions that, in response to execution of the instructions by a processor, cause the processor to:
- compare one or more spatial aspects of a first visual annotation of a first candidate plant trait instance depicted in a first stereo image to one or more spatial aspects of a second visual annotation of a second candidate plant trait instance depicted in a second stereo image;
- based on the comparison, determine that the first and second candidate plant trait instances are a match for the same plant trait instance across the first and second stereo images;
- determine a disparity between the first and second candidate plant trait instances;
- based on the disparity, estimate a depth associated with the same plant trait instance; and
- cause output to be provided at a computing device, wherein the output is generated based on the depth associated with the same plant trait instance.

20. The non-transitory computer-readable medium of claim 19, further comprising instructions to:
- compare one or more spatial aspects of a third visual annotation of a third candidate plant trait instance depicted in the first stereo image to one or more spatial aspects of a fourth visual annotation of a fourth candidate plant trait instance depicted in the second stereo image;
- based on the comparison of the spatial aspects of the third and fourth visual annotations, determine that the third and fourth candidate plant trait instances are a match for an additional same plant trait instance across the first and second stereo images; and
- determine an additional depth associated with the additional same plant trait instance;
- wherein the output is further generated based on the additional depth.

* * * * *